(12) United States Patent
Wiley

(10) Patent No.: US 7,735,456 B2
(45) Date of Patent: Jun. 15, 2010

(54) PET VEHICLE SAFETY RESTRAINT DEVICE

(76) Inventor: Ruth Wiley, 21600 King Henry Ave., Leesburg, FL (US) 34748

(*) Notice: Subject to any disclaimer, the term of this patent is extended or adjusted under 35 U.S.C. 154(b) by 547 days.

(21) Appl. No.: 11/701,490

(22) Filed: Feb. 2, 2007

(65) Prior Publication Data

US 2008/0184942 A1 Aug. 7, 2008

(51) Int. Cl.
*A01K 15/02* (2006.01)
*A01K 27/00* (2006.01)
*A01K 29/00* (2006.01)
*B60R 22/10* (2006.01)

(52) U.S. Cl. ........................ 119/771; 119/755
(58) Field of Classification Search .......... 119/755, 119/756, 771, 792, 856; 297/465, 485; *A01K 15/02, A01K 27/00, 29/00; B60R 22/10*
See application file for complete search history.

(56) References Cited

U.S. PATENT DOCUMENTS

| | | | | |
|---|---|---|---|---|
| 1,298,615 A * | 3/1919 | Wilkinson | ............... | 244/122 B |
| 3,310,034 A * | 3/1967 | Dishart | ........................ | 119/771 |
| 4,226,474 A * | 10/1980 | Rupert et al. | ................ | 297/484 |
| 4,324,204 A | 4/1982 | Friedman | | |
| 4,597,359 A * | 7/1986 | Moorman | ................... | 119/28.5 |
| 4,715,618 A * | 12/1987 | Harris | ........................ | 119/771 |
| 4,970,991 A * | 11/1990 | Luce | ........................... | 119/771 |
| 5,005,526 A | 4/1991 | Parker | | |
| 5,044,321 A | 9/1991 | Selph | | |
| 5,133,294 A * | 7/1992 | Reid | ........................... | 119/771 |
| 5,443,037 A | 8/1995 | Saleme | | |
| 5,479,892 A * | 1/1996 | Edwards | ..................... | 119/771 |
| 5,537,952 A | 7/1996 | Devlin | | |
| 5,544,363 A * | 8/1996 | McCue et al. | .................. | 2/102 |
| 5,551,373 A | 9/1996 | O'Donnell | | |
| 5,632,235 A | 5/1997 | Larsen et al. | | |
| 5,785,003 A * | 7/1998 | Jacobson et al. | ............ | 119/496 |
| 5,810,227 A * | 9/1998 | Jorgensen | .................... | 224/413 |
| 5,839,394 A | 11/1998 | Dickison | | |
| 5,915,335 A * | 6/1999 | Holt, Jr. | ...................... | 119/771 |
| 6,253,713 B1 * | 7/2001 | Giedeman et al. | ........... | 119/771 |
| 6,397,783 B1 | 6/2002 | Koch | | |
| 6,742,848 B2 * | 6/2004 | Ruff | ............................ | 297/485 |
| 6,827,044 B2 * | 12/2004 | Lobanoff et al. | ............ | 119/771 |
| 2005/0268863 A1 | 12/2005 | Wiley | | |
| 2007/0157891 A1 * | 7/2007 | Wayn | .......................... | 119/771 |

* cited by examiner

*Primary Examiner*—Son T Nguyen
*Assistant Examiner*—Marisa Conlon
(74) *Attorney, Agent, or Firm*—Leander F. Aulisio

(57) ABSTRACT

A pet vehicle safety restraint device for protection of household animals, the device including a one piece molded base frame having a pet seating floor and a back panel, the pet seating floor and the back panel being in a substantially ninety degrees relationship to one another; a harnessing system designed to contain the upper torso of a pet and containing an adjustable and flexible chest band; and a first adjustable leash, a second adjustable leash and a third adjustable leash, the adjustable leashes connecting the harnessing system, and subsequently a pet, to the one piece molded frame wherein the one piece molded frame is ultimately connected to the vehicle by means of a vehicle seat belt.

1 Claim, 5 Drawing Sheets

PET VEHICLE SAFETY RESTRAINT DEVICE

BACKGROUND OF THE INVENTION

Pet vehicle safety restraint devices are needed to provide safety for pets, vehicle occupants, pedestrians and other vehicles. Devices generally tend to become portable for ease of installation and removal from the vehicle. The restraint devices must be comfortable for the pet, but at the same time provide a large degree of safety for the pets. Since pets do not sit in the same way as humans, there is a need for a pet-friendly design that allows for use by various body sizes. Thus small animals and rather larger animals can be restrained by use of the same safety device.

Published Patent Application US 2006/0150922, published to Kroculick, relates to a portable pet transportation device, especially for medium and large size pets. A thin, lightweight, rigid device rests on a seat of the vehicle, with a portion of the device snugly inserted between the seat and the backrest. A portion of the device extends over the footrest area.

Published Patent Application US 2004/0182329, published to Kroculick, relates to a portable pet transportation device, especially for medium and large size pets. A thin, lightweight, rigid device rests on a seat of the vehicle, with a portion of the device snugly inserted between the seat and the backrest. A portion of the device extends over the footrest area.

U.S. Pat. No. 5,551,373, issued to O'Donnell, relates to a portable pet booster seat apparatus. It includes a base portion and wall portions. A removable and replaceable cover assembly is also disclosed.

U.S. Pat. No. 5,839,394, issued to Dickison, relates to an adjustable leash that incorporates a shock absorbing handle and an automatically releasing wrist strap.

U.S. Pat. No. 5,632,235, issued to Larsen et al, relates to a pet flotation aid and walker that includes a hollow top panel that contains a piece of internal foam flotation material. An adjustable belly strap is also disclosed.

U.S. Pat. No. 5,479,892, issued to Edwards, relates to a vehicle safety seat for pets that includes four relatively low walls surrounding a central pet seating area. The walls extend upward from a storage compartment situated below a removable pet seating floor. The rearward portions of the side walls and the back wall can contain strap passages and straps extending therefrom. The straps are attachable to a harness or halter that is in turn secured about the upper torso of a pet. When properly secured, the pet seat secures the pet in a positive fashion.

U.S. Pat. No. 4,907,541, issued to Thompson, relates to an easily transportable pet restraint that keeps a pet within certain bounds in a vehicle. It also serves to prevent injury to the pet in the event of a vehicular accident. The pet is restrained with a harness having an adjustable flexible belly band, a flexible chest band that is joined to the belly band, and a flexible collar joined to the chest band. A member connects the belly band and the collar at a clasp secured to the member to join with existing seat belts in a vehicle.

SUMMARY OF THE INVENTION

A pet vehicle safety restraint device is hereby disclosed. The device prevents injury to a pet in case of a vehicular accident or an abrupt stoppage of the vehicle. The device also prevents a pet from climbing throughout the vehicle. The pet vehicle safety restraint device comprises a base frame, a harnessing system and two adjustable leashes. The base frame comprises a pet seating floor and a back panel. The pet seating floor and back panel are in a substantially ninety degrees relationship to one another. Preferably, the base frame comprises a one piece molded unit. The back panel secures the restraint device by attachment with a vehicle seat belt. The pet seating floor has a substantially centrally located first attachment means, and the back panel has a substantially centrally located second attachment means.

The harnessing system is employed for containing an upper torso of a pet. The harnessing system is substantially free of metal clips or buckles. This makes it more comfortable for the pet. The harnessing system comprises an adjustable flexible chest band. The harnessing system further comprises a third attachment means located on an underside of the chest band. There is also a fourth attachment means located on the upperside of the chest band.

The first adjustable leash has a distal end and a proximal end. The proximal end is closer to the base frame. The first leash is removably attached to the back panel at the second attachment means. The first leash is removably attached at the distal end to the collar band as by a fourth attachment means.

The second adjustable leash has a distal end and a proximal end. The proximal end of the second adjustable leash is closer to the base frame. The second leash is removably attached at its proximal end to the pet seating floor at the first attachment means. The second leash is removably attached at its distal end to the chest band as by a third attachment means.

When a pet is placed in the harness system, the harnessing system being securely attached to the vehicle seat by means of the vehicle seat belts, the pet is relatively safe from harm in case of an accident.

DETAILED DESCRIPTION OF THE INVENTION

Figure 1:
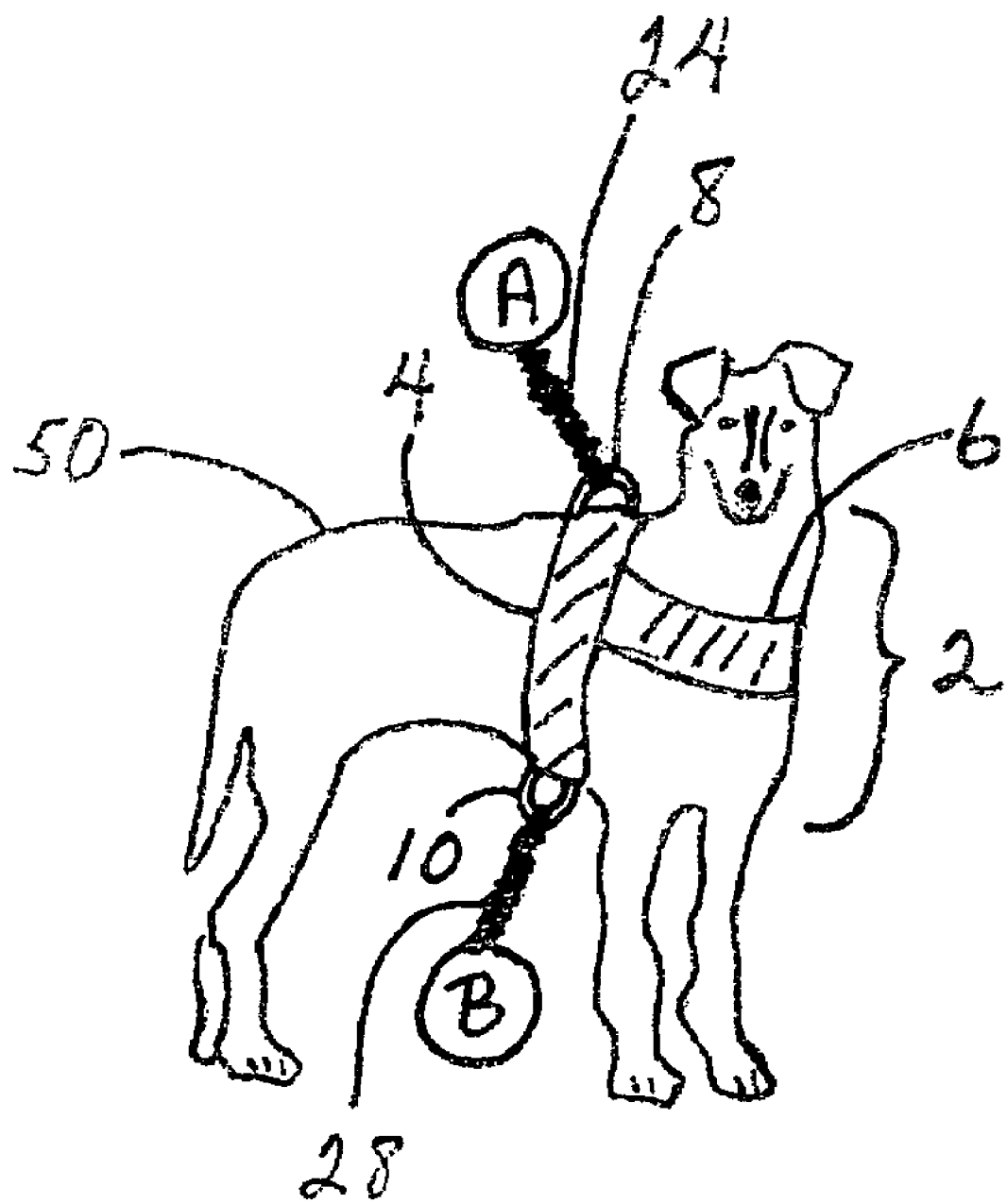
FIG. 1 is a representation of a harnessing system of the present invention, the harnessing system having at least two attachment means for receiving leashes. The harnessing system is situated on a pet.

A pet vehicle safety restraint device is hereby disclosed. The device comprises: a base frame comprising a pet seating floor and a back panel, the floor and panel being in a substantially ninety degrees relationship to one another; the base frame comprising a one piece molded unit. The back panel secures the restraint device with a vehicle seat belt. The base frame comprises at least two apertures for receiving a vehicle seat belt, the at least two apertures being located near the junction of the back panel and the pet seating floor. The pet seating floor has a substantially centrally located first attachment means; and the back panel has a substantially centrally located second attachment means. The device further comprises: a harnessing system for containing an upper torso of a pet; the harnessing system being substantially free of metal clips or buckles. The harnessing system comprises an adjustable flexible chest band. The harnessing system further comprises a third attachment means located on an underside of the chest band, and a fourth attachment means located on the upperside of the chest band.

The device further comprises a first adjustable leash having a distal end and a proximal end. The first leash is removably attached at its proximal end to the back panel at the second attachment means. The first leash is removably attached at its distal end to the chest band as by the fourth attachment means. The device further comprises a second adjustable leash having a distal end and a proximal end. The second leash is removably attached at its proximal end to the pet seating floor at the first attachment means. The second leash is removably attached at its distal end to the chest band as by the third attachment means.

In a preferred embodiment, the one piece molded unit comprises an extrusion molded thermoplastic material. Preferably, the first, second, third and fourth attachment means are metal loops or plastic loops. The adjustable flexible band comprises hook and loop fastening means (Velcro).

The adjustable flexible chest band further comprises a member selected from the group consisting of: nonwoven synthetic material, woven synthetic material, and woven natural material. The adjustable flexible band further comprises a padding material that substantially covers at least one side of the bands. The side that is covered by the padding material is the side that contacts the skin of the pet. Padding material can be selected from materials such as synthetic foam material such as foamed polyurethane, and natural fibers such as cotton.

The base frame of the device comprises apertures for receiving the vehicle seat belt. The vehicle seat belt can be looped through the base frame and then locked in order to secure the pet vehicle safety restraint device. Preferably, the apertures are located near the junction of the back panel and the pet seating floor.

A method for securing a pet into a seat of a vehicle is hereby disclosed. The method comprises the steps of: obtaining a pet vehicle safety restraint device; placing the device on a seat of the vehicle, wherein the pet seating floor rests on the seat of the vehicle; looping a seat belt of the vehicle through apertures in the pet vehicle safety device; and fastening the seat belt to secure the device to the vehicle seat. A pet, which is member selected from the group consisting of a dog and a cat, can then be placed into the harnessing system of the device. The flexible bands of the harnessing device are then adjusted to substantially secure the pet within the harnessing system. The pet vehicle safety restraint device comprises a base frame comprising a pet seating floor and a back panel The pet seating floor and back panel are in a substantially ninety degrees relationship to one another. The base frame comprises a one piece molded unit. Preferably, the one piece molded unit comprises an extrusion molded thermoplastic material.

The method further comprises employing a pet seating floor that has a substantially centrally located first attachment means, and a back panel that has a substantially centrally located second attachment means. The base frame comprises at least two apertures for receiving a vehicle seat belt. The two apertures are located near the junction of the back panel and the pet seating floor. The apertures can be on the pet seating floor or on the back panel.

The method further comprises employing a harnessing system for containing an upper torso of a pet is also disclosed. The harnessing system is substantially free of metal closure devices such as metal clips and metal belt buckles. Further, the harnessing system comprises an adjustable flexible chest band. A third attachment means is located on the underside of the chest band, and a fourth attachment means is located on the upperside of the chest band. A first adjustable leash; which has a distal end and a proximal end, the proximal end being closer to the base frame; is removably attached at the proximal end to the back panel at the second attachment means. The first leash is removably attached at the distal end to the chest band as by the fourth attachment means. A second adjustable leash; which has a distal end and a proximal end, the proximal end being closer to the base frame; is removably attached at the proximal end to the pet seating floor at the first attachment means. Further, the second leash is removably attached at the distal end to the chest band as by the third attachment means.

It is within the scope of the present invention to have more than two attachment means on the base frame. It is possible to have a substantially triangular pet restraint means by placing two attachment means on the pet seating floor and one attachment means on the back panel. The two floor attachments are spaced apart, as they are preferably positioned near the sides of the seating floor. In the alternative, the two attachment means can be positioned on the back panel, the attachment means being preferably positioned near the sides of the back panel; and a third attachment means is positioned in substantially the center of the pet seating floor.

Referring to FIG. 1, a harnessing system of the present invention is represented. The system comprises an adjustable flexible chest band 2 comprising a substantially circular upper torso band 4 and a collar band 6, wherein the collar band 6 is directly attached to the upper torso band 4 as by sewing or the like. A first attachment means 8 is positioned on the upperside of the flexible chest band 2. A second attachment means 10 is positioned on the underside of the flexible chest band 2. A first leash 24 is attached as by attachment means 8 to the harnessing system; and a second leash 28 is attached as by attachment means 10 to the harnessing system. A and B represent points of attachment for leash 24 and leash 28, respectively.

Figure 2:
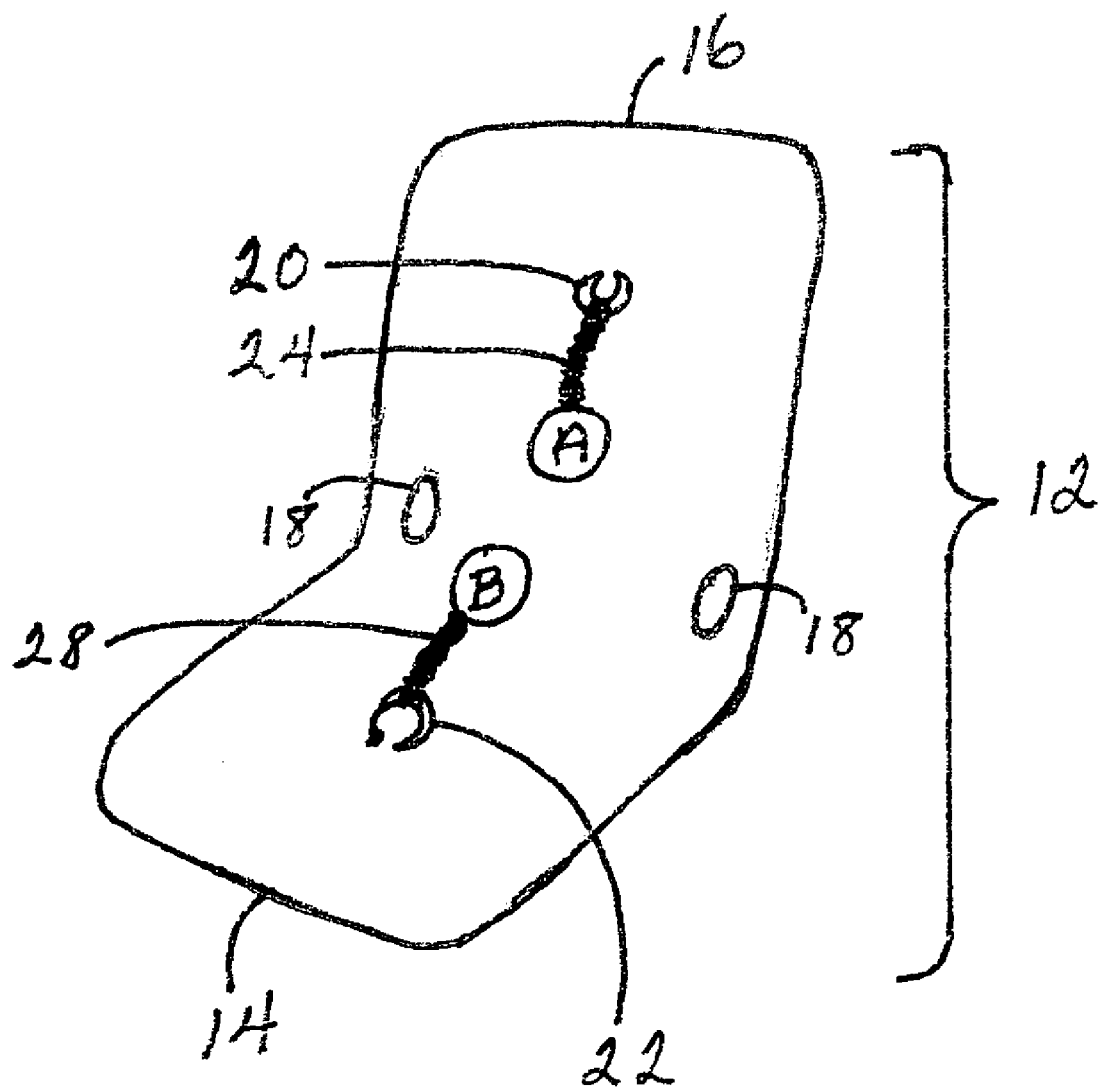
FIG. 2 is a representation of a pet vehicle safety restraint device of the present invention, the device comprising a base frame that comprises a pet seating floor and a back panel. Both the back panel and the floor contain an attachment means for receiving a leash.

Referring to FIG. 2, a base frame 12 of the present invention is represented. The base frame 12 comprises a back panel 16 and a pet seating floor 14. A first attachment means 20 is located substantially in the middle of the back panel 16. It is within the scope of the present invention to situate the attachment means 20 at other locations on the back panel 16. A first leash 24 is attached as by attachment means 20 to the base frame 12. A second leash 28 is attached as by attachment means 22 to the base frame 12. Apertures 18 are located near the junction of back panel 16 and pet seating floor 14. The apertures 18 are useful for receiving a seat belt of the vehicle. When the seat belt is fastened, the base frame 12 is secured to a seat of the vehicle. A and B represent points of attachment for leash 24 and leash 28, respectively.

Figure 3:
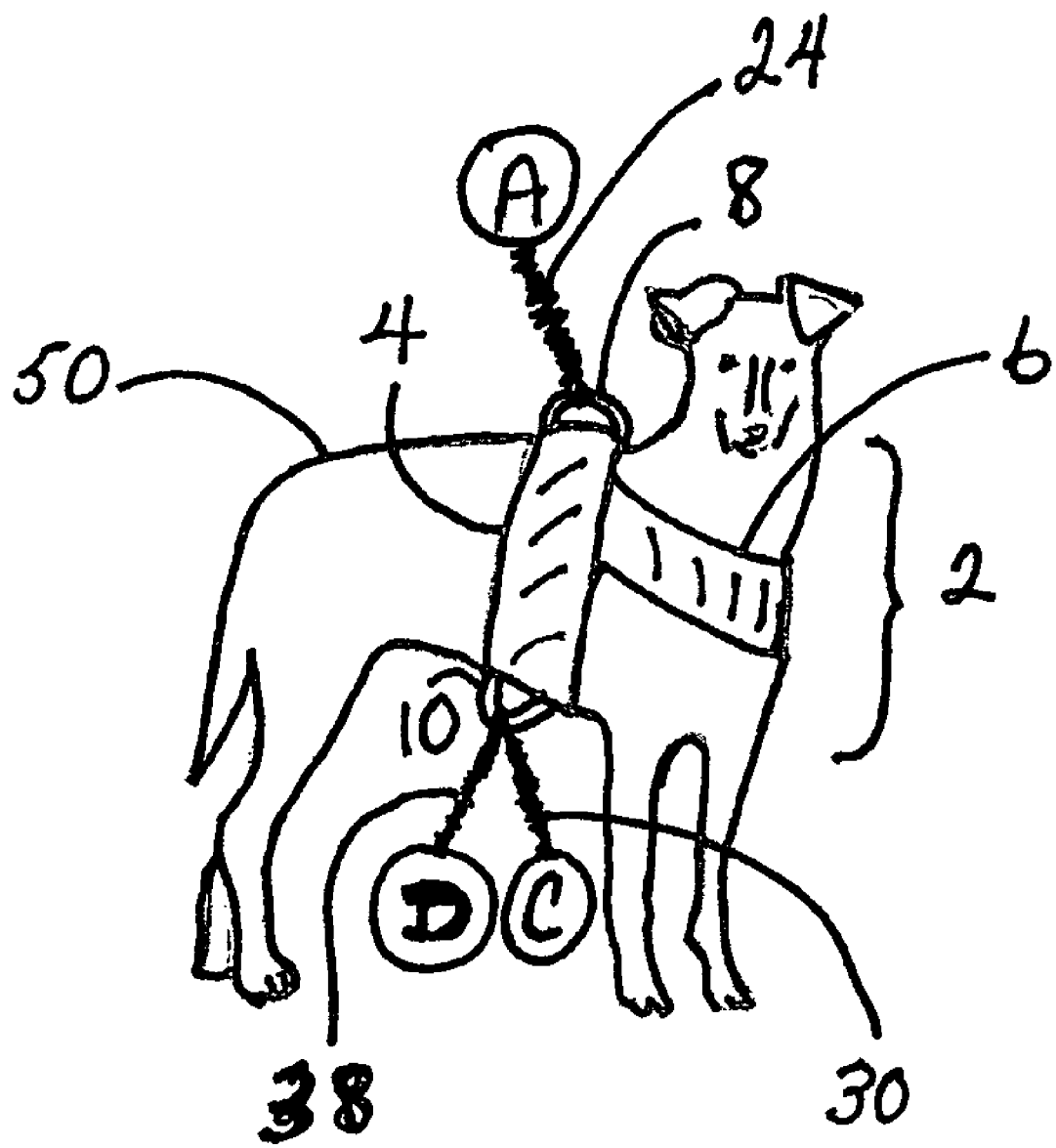
FIG. 3 is a representation of an alternative embodiment of the present invention. The harnessing system has three leashes attached to the system as by two attachment means. The harnessing system is situated on a pet.

Referring to FIG. 3, a harnessing system of an alternative embodiment of the present invention is represented. The harnessing system comprises an adjustable flexible chest band 2 comprising a substantially circular upper torso band 4 and a collar band 6, wherein the collar band 6 is directly attached to the upper torso band 4 as by sewing or the like. A first attachment means 8 is positioned on the upperside of the flexible chest band 2. A second attachment means 10 is positioned on the underside of the flexible chest band 2. A first leash 24 is attached as by attachment means 8 to the harnessing system. A second leash 30 is attached as by attachment means 10 to the harnessing system. A third leash 38 is attached as by attachment means 10 to the harnessing system. A, C and D represent points of attachment for leash 24, leash 30 and leash 38, respectively.

Figure 4:
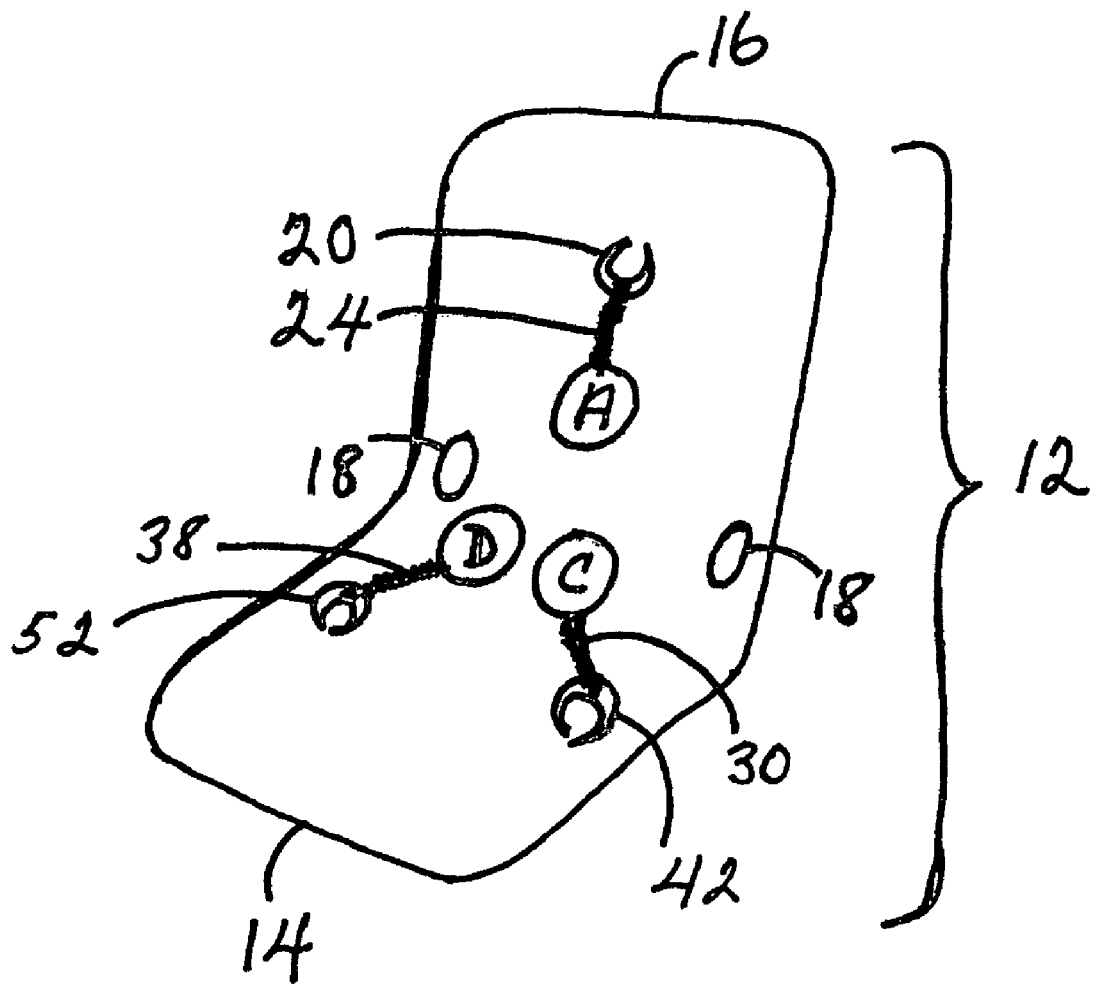
FIG. 4 is a representation of an alternative embodiment for a pet vehicle safety restraint device of the present invention, the device comprising a base frame that comprises a pet seating floor and a back panel. The back panel contains an attachment means for receiving a leash; and the pet seating floor contains two attachment means for receiving two leashes.

Referring to FIG. 4, a base frame 12 of the present invention is represented. The base frame 12 comprises a back panel 16 and a pet seating floor 14. A first attachment means 20 is located substantially in the middle of the back panel 16. It is within the scope of the present invention to situate the attachment means 20 at other locations on the back panel 16. A first leash 24 is attached as by attachment means 20 to the base frame 12. A second leash 30 is attached as by attachment means 42 to the base frame 12. A third leash 38 is attached as by attachment means 52 to the base frame 12. Apertures 18 are located near the junction of back panel 16 and pet seating floor 14. The apertures 18 are useful for receiving a seat belt of the vehicle. When the seat belt is fastened, the base frame 12 is secured to a seat of the vehicle. A, C and D represent points of attachment for leash 24, leash 30 and leash 38, respectively.

Figure 5:
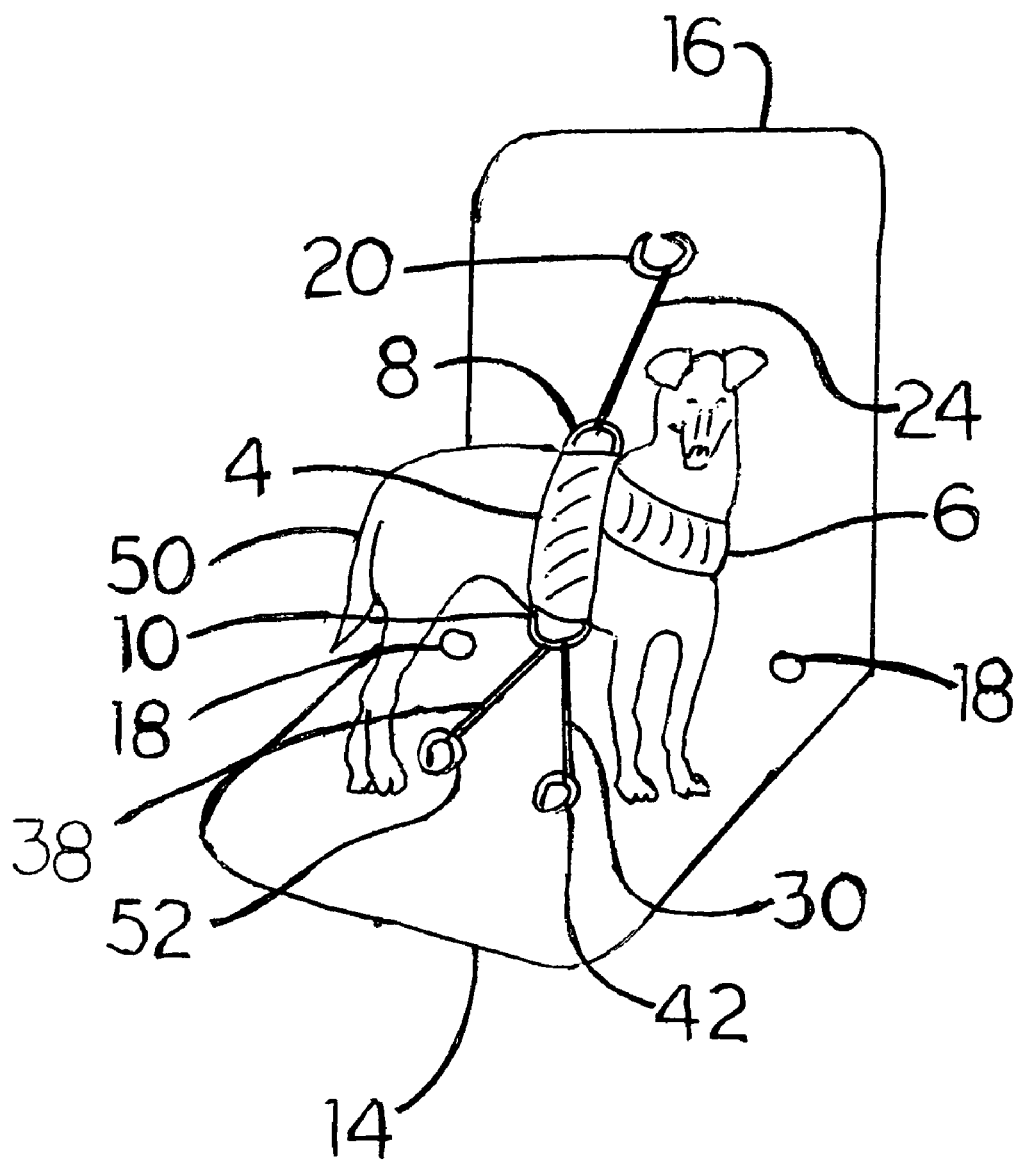
FIG. 5 is a representation of an embodiment of the present invention depicting a pet situated in the pet restraint device of the present invention.

Referring to FIG. 5, a pet 50 is situated in the pet vehicle safety restraint device of the present invention. The device includes a harnessing system for the pet 50 containing a substantially circular upper torso band 4 and a collar band 6, wherein the collar band 6 is directly attached to the upper torso band 4 as by sewing or the like. The pet 50 is placed within the harnessing system. A first attachment means 8 is positioned on the upperside of the upper torso band 4. A second attachment means 10 is positioned on the underside of the upper torso band 4. A first leash 24 is attached as by attachment means 8 to the upper torso band 4. A second leash 30 is attached as by attachment means 10 to the upper torso band 4. A third leash 38 is attached as by attachment means 10 to the upper torso band 4. The device further includes a base frame containing a back panel 16 and a pet seating floor 14. A first attachment means 20 is located substantially in the middle of the back panel 16. It is within the scope of the present invention to situate the attachment means 20 at other locations on the back panel 16. A first leash 24 is attached as by attachment means 20 to the back panel 16. A second leash 30 is attached as by attachment means 42 to the pet seating floor 14. A third leash 38 is attached as by attachment means 52 to the pet seating floor 14. Apertures 18 are located near the junction of back panel 16 and pet seating floor 14. The apertures 18 are useful for receiving a seat belt of the vehicle. When the seat belt is fastened, the base frame is secured to a seat of the vehicle.

While the invention has been described by specific examples and embodiments, there is no intent to limit the inventive concept except as set forth in the following claims.

I claim:

1. A pet vehicle safety restraint device consisting of:
   (a) a one piece molded base frame consisting of a pet seating floor and a back panel, wherein the pet seating floor and the back panel are in a substantially ninety degrees relationship to one another, wherein the back panel contains a first attachment means, the first attachment means being substantially centrally located on the back panel; wherein the pet seating floor contains a second attachment means and a third attachment means, the second attachment means being located on one side of the pet seating floor and the third attachment means being located on the other side of the pet seating floor; wherein the one piece molded base frame further contains at least two apertures for receiving a vehicle seat belt, the at least two apertures being located substantially near the junction of the pet seating floor and the back panel;
   (b) a harnessing system wherein the harnessing system is designed to contain the upper torso of a pet and wherein the harnessing system consists of an adjustable and flexible chest band having an upperside and an underside, wherein the adjustable and flexible chest band contains a fourth attachment means and a fifth attachment means, the fourth attachment means being located substantially on the underside of the adjustable and flexible chest band, and the fifth attachment means being located substantially on the upperside of the chest band; and
   (c) a first adjustable leash, a second adjustable leash and a third adjustable leash; wherein the first adjustable leash removably connects the first attachment means to the fifth attachment means; the second adjustable leash removably connects the second attachment means to the fourth attachment means, and the third attachment leash removably connects the third attachment means to the fourth attachment means.

* * * * *